United States Patent
Stoeberl et al.

(10) Patent No.: US 10,190,459 B2
(45) Date of Patent: Jan. 29, 2019

(54) INJECTION DEVICE

(71) Applicant: Robert Bosch GmbH, Stuttgart (DE)

(72) Inventors: Thorsten Stoeberl, Ludiwigsburg-Hoheneck (DE); Dirk Welting, Weissach (DE); Rainer Haeberer, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 105 days.

(21) Appl. No.: 15/319,438

(22) PCT Filed: May 27, 2015

(86) PCT No.: PCT/EP2015/061690
§ 371 (c)(1),
(2) Date: Dec. 16, 2016

(87) PCT Pub. No.: WO2015/193069
PCT Pub. Date: Dec. 23, 2015

(65) Prior Publication Data
US 2017/0321586 A1      Nov. 9, 2017

(30) Foreign Application Priority Data
Jun. 16, 2014   (DE) .................. 10 2014 211 494

(51) Int. Cl.
*F02M 61/00*   (2006.01)
*F01N 3/20*    (2006.01)

(52) U.S. Cl.
CPC ........ *F01N 3/2066* (2013.01); *F01N 2610/02* (2013.01); *F01N 2610/1453* (2013.01); *Y02T 10/24* (2013.01)

(58) Field of Classification Search
CPC .... F01N 13/009; F01N 3/2006; F01N 3/2046; F01N 3/2053; F01N 2610/1453;
(Continued)

(56) References Cited

U.S. PATENT DOCUMENTS 1,693,931 A * 12/1928 Lowe ................. F02M 61/00
                                                    123/275
3,159,349 A    12/1964 Crocco et al.
(Continued)

FOREIGN PATENT DOCUMENTS

DE        4221185 A1 *  1/1994   ......... F02M 51/0682
DE     102006012855      9/2007
(Continued)

OTHER PUBLICATIONS

English Translation of DE4221185.*
(Continued)

*Primary Examiner* — Audrey K Bradley
*Assistant Examiner* — Anthony Ayala Delgado
(74) *Attorney, Agent, or Firm* — Michael Best & Friedrich LLP

(57) ABSTRACT

The invention relates to an injection device (1), in particular for an exhaust aftertreatment system of an internal combustion engine, comprising a pressure-controlled, outward-opening fuel injection valve (2) that includes an axially movable valve piston (6) which penetrates a flow opening (7) in a valve body (5) and one end of which has a valve tip (9), further comprising a valve seat (8) associated with the flow opening (7), and at least one spring element (11) which urges the valve piston (6) comprising the valve tip (9) against the valve seat (8) so that the flow opening (7) is closed; the valve tip (9) is axially movable inside a flow chamber (15) formed by the valve body (5) and by an injection orifice disk (14) that includes a plurality of injection ports (19).

12 Claims, 1 Drawing Sheet

(58) Field of Classification Search
CPC ........... F02M 61/1853; F02M 61/1806; F02M 61/1833; F02M 61/162; F02M 61/08; F02M 61/1813; F02M 51/0678; F02M 61/18; F02M 51/0682; F02M 61/163; F02M 61/1846; F02M 61/1873; F02M 61/188; F02M 2200/505; F02M 2700/07; F02M 47/046; F02M 61/00; F02M 61/1866

See application file for complete search history.

(56) References Cited

U.S. PATENT DOCUMENTS

| | | | | |
|---|---|---|---|---|
| 9,683,739 | B2* | 6/2017 | Hicks | ............... F23D 11/383 |
| 2003/0084883 | A1 | 5/2003 | Parrish | |
| 2003/0201344 | A1* | 10/2003 | Wark | ................. F02M 47/00 239/533.8 |
| 2003/0234005 | A1* | 12/2003 | Sumisha | ............ F02M 51/0678 123/467 |
| 2004/0050976 | A1* | 3/2004 | Kitamura | ........... F02M 51/0678 239/584 |
| 2006/0277898 | A1* | 12/2006 | McCarthy, Jr. | ....... F01N 3/0842 60/286 |
| 2009/0025373 | A1 | 1/2009 | Burglin et al. | |

FOREIGN PATENT DOCUMENTS

| | | |
|---|---|---|
| EP | 0040852 | 12/1981 |
| EP | 1878920 | 1/2008 |
| WO | 9400686 | 1/1994 |
| WO | 2007022206 | 2/2007 |

OTHER PUBLICATIONS

International Search Report for Application No. PCT/EP2015/061690 dated Sep. 10, 2016 (English Translation, 2 pages).

* cited by examiner

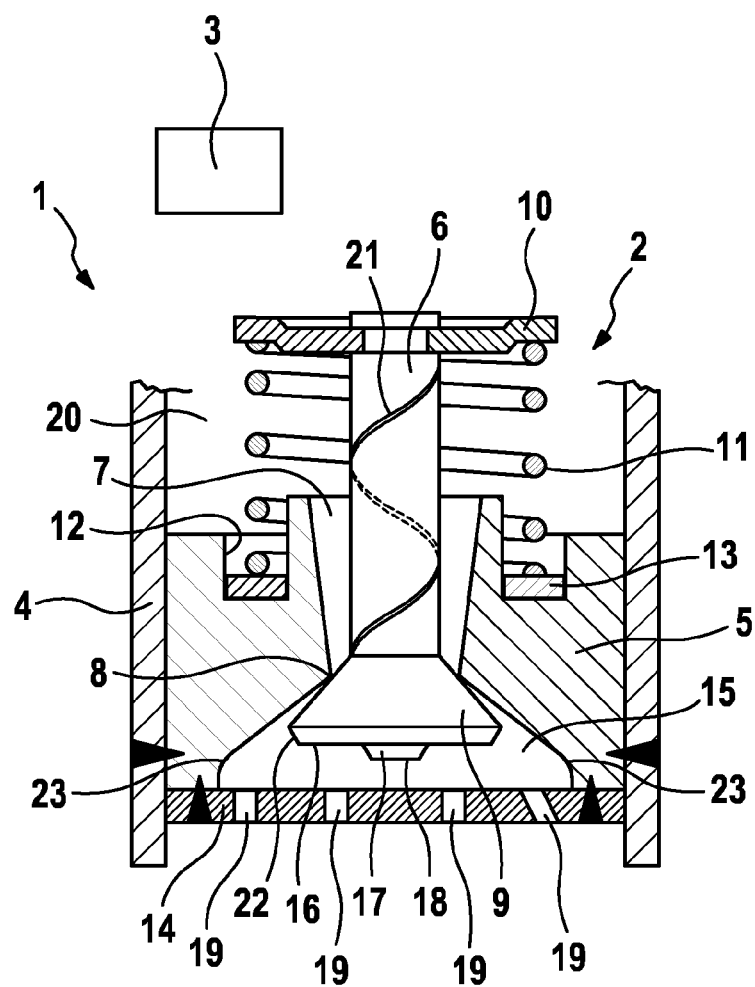

INJECTION DEVICE

BACKGROUND OF THE INVENTION

The invention relates to an injection device, in particular for an exhaust-gas aftertreatment system of an internal combustion engine.

Injection devices of the aforementioned type are known. German laid-open specification DE 10 2006 912855 A1 discloses, for example, an injection system comprising a nozzle module which is assigned to an exhaust-gas pipe of an internal combustion engine in order to inject pressurized liquid exhaust-gas aftertreatment agent there into the exhaust gas. In the case of motor vehicles having an internal combustion engine, exhaust-gas legislation requires, inter alia, that the pollutant NOx must be reduced. A method which is frequently used here is the so-called SCR process (SCR=selective catalytic reduction) in which the pollutant NOx is reduced to nitrogen and water with the aid of a liquid exhaust-gas aftertreatment agent, which is generally an aqueous urea solution. The exhaust-gas aftertreatment agent is sucked in through an injection device from a tank and then injected into the exhaust gas. A corresponding injection device is also known from EP 1 878 920 B1, for example. In that document, the injection device has a valve piston which at first compresses exhaust-gas aftertreatment agent by means of an electromagnetic actuator and then injects it into the exhaust gas. The valve piston is then moved back into its starting position by a spring element, with the result that fresh reducing agent is sucked in. To achieve a high NOx reduction, it is necessary for the exhaust-gas aftertreatment agent to be mixed particularly effectively with the exhaust gas. For this purpose, it is advantageous if the injected spray is very fine or contains small drops. In the case of the cited publications, injection devices are provided which have an inner-opening injection valve. An inner-opening injection valve is to be understood as meaning a valve in which a valve tip of the valve piston interacts—as viewed in the throughflow direction of the throughflow opening—with a valve seat provided upstream of a throughflow opening.

German laid-open specification WO 94/00686 also discloses a perforated injection disk for injection valves which is provided with a plurality of injection openings for the targeted establishment of a spray.

SUMMARY OF THE INVENTION

The injection device according to the invention having the features of claim 1 has the advantage that, on the one hand, a particularly fine spray is generated, and that, on the other hand, in particular the valve seat of the injection valve is securely protected from, for example, soot particles present in the exhaust gas, with the result that a long service life of the injection device can be ensured. The injection device according to the invention is distinguished by the fact that it comprises a pressure-controlled and outward-opening injection valve which comprises an axially displaceable valve piston which penetrates through a throughflow opening in a valve body and has a valve tip at one end, a valve seat assigned to the throughflow opening, and at least one spring element which urges the valve piston comprising the valve tip against the valve seat in order to close the throughflow opening, wherein the valve tip is axially displaceable in a flow chamber which is formed, on the one hand, by the valve body and, on the other hand, by a perforated injection plate which has a plurality of injection openings. Owing to the fact that the valve tip closes the throughflow opening externally, a particularly fine spray is generated when opening the injection valve. As a result of the perforated injection plate following in the flow direction, the spray is distributed further through the injection openings formed therein, with the result that it is also possible to establish advantageous collision beams which lead to a further reduction in droplet size. It is simultaneously ensured thereby that the perforated injection plate substantially or at least to a large part covers the valve piston and the valve opening and thereby provides protection from direct contact with the exhaust gas of the internal combustion engine. The particular design of the injection device ensures that the exhaust gases do not pass in particular to the valve seat, thereby preventing contamination of the valve seat which leads to leakage. Moreover, the interaction of the valve piston with the valve seat and the additional spring element also makes it possible to achieve high injection pressures.

According to an advantageous development of the invention, there is provision that the valve tip has, on its underside opposed to the seat, an axial stop interacting with the perforated injection plate. The advantageous development thus ensures that the valve piston is displaceable to such a maximum extent until it butts against the perforated injection plate by way of the axial stop. The perforated injection plate thus offers yet a further function, namely a stroke limitation for the valve piston. The maximum stroke of the valve piston can be set in a simple manner by correspondingly designing and arranging the axial stop and perforated injection plate. Consequently, a narrow maximum gap between the valve tip and valve seat can be set and ensured at any time.

The axial stop is preferably formed by an axial projection on the flat underside of the valve tip that is assigned to the perforated injection plate. By virtue of the fact that the underside of the valve tip assigned to the perforated injection plate is, on the one hand, flat and, on the other hand, has a projecting axial stop, a gap is also ensured between the perforated injection plate and the valve tip in the maximum stroke position of the piston, with the result that the spray dispersal is further improved.

Furthermore, provision is preferably made for the flow chamber to have a longitudinal section which corresponds at least substantially to the longitudinal section of the valve tip. It is ensured thereby that a narrow annular flow channel is formed between the valve tip and the valve body in the flow chamber, which flow channel leads to optimum media routing or distribution of the liquid exhaust-gas aftertreatment agent. In particular, the valve tip and the valve body are designed in such a way that a narrow gap is formed between the valve body and valve tip if the valve piston is in its maximum stroke position, with the result that the liquid is very greatly accelerated in accordance with the continuity equation in order to generate a very fine spray.

According to an advantageous development of the invention, provision is made for the valve piston to be provided with a thread-like or helical groove. The thread-like groove extends in particular along a cylindrical piston shaft of the valve piston to the valve tip. The valve tip itself is preferably formed in a groove-free manner. The thread-like groove causes a swirl to be introduced into the medium to be injected, which swirl leads to improved spray distribution.

With particular preference, the throughflow opening in the valve body has a cross section which—as viewed in the throughflow direction—tapers in the direction of the valve seat. The valve piston expediently has a substantially constant diameter to the valve tip, so that the flow space between the valve piston and valve body in the region of the throughflow opening decreases toward the valve seat, with the result that the velocity of the medium to be injected increases toward the valve seat. Particularly in conjunction with the helical or thread-like groove, this results in the liquid experiencing a swirl and gaining velocity, with the result that a particularly fine spray is generated if the throughflow opening is at least partially opened by displacing the valve piston.

Furthermore, provision is preferably made for the injection device to have a pressure generator, with the result that the pressure generator, together with the injection valve, forms a pump-nozzle unit. Consequently, a particularly compact injection device is ensured which offers the above-described advantages in respect of the fine spray and the protection of the injection valve from contamination.

The method according to the invention is distinguished by the fact that the perforated injection plate is plastically deformed in order to set a maximum piston stroke of the valve piston. As a result, the maximum valve stroke of the valve piston can be set in a simple manner.

BRIEF DESCRIPTION OF THE DRAWINGS

The invention will be explained in more detail below with reference to the drawing, in which FIG. 1 shows an injection device in a simplified longitudinal sectional illustration.

DETAILED DESCRIPTION

The FIGURE shows in a simplified longitudinal sectional illustration an injection device 1 which comprises a pressure-controlled and outward-opening injection valve 2 and a pressure generator 3 (only indicated here). The pressure generator 3 can be, for example, an, in particular electrically operated, hydraulic pump.

The injection valve 2 comprises a housing 4 in which a valve body 5 is fixedly arranged and a valve piston 6 is axially displaceably arranged. The valve body 5 has a throughflow opening 7 which is at least substantially traversed by the valve piston 6. The throughflow opening 7 tapers—as viewed in the longitudinal direction—toward its center, with the result that it has a first and a second portion which are each designed to at least substantially widen outwardly in a v shape. The valve body 5 has a valve seat 8 at the narrowest point of the throughflow opening 7. The valve seat 8 is assigned a valve tip 9 of the valve piston 6, which valve tip likewise has a v-shaped longitudinal section, with the result that the valve piston 6 widens in cross section at its end having the valve tip 9. The valve tip 9 is thus formed or arranged frustoconically on the end of the valve piston 6 such that the valve seat 8 can interact with the conical lateral wall of the valve tip 9 to close the throughflow opening 7. The valve tip 9 is thus provided, at least in certain portions, with a larger diameter than the throughflow opening 7 at its narrowest point. At the end opposed to the valve tip 9, the piston is provided with a supporting plate 10 which is held axially fixedly on the valve piston 6. A spring element 11, which in the present case takes the form of a helical spring, is held in a preloaded manner between the supporting plate 10 and the valve body 5, with the result that the spring element 11 pulls or urges the valve piston 6 comprising the valve tip 9 against the valve seat 8 via the supporting plate 10. The spring element 11 is thus arranged on that side of the tapering of the throughflow opening 7 opposed to the valve seat 8.

In this case, the valve body 5 preferably has, as illustrated in the present exemplary embodiment, an annular depression 12 in which the helical spring is situated in certain regions for guidance thereof. A spacer ring 13 is advantageously also provided in the depression 12. The preloading of the spring element 11 can be influenced or set in a simple manner by selecting the thickness or height of the spacer ring 13.

In the position of the valve piston 6 in which it closes the throughflow opening 7, the valve tip 9 is situated completely in the second portion of the throughflow opening 7. In this position of the valve piston 6, the contour of the longitudinal section of the throughflow opening 7 is preferably adapted to the contour of the valve tip 9. Moreover, a perforated injection plate 14, which particularly takes the form of a perforated injection disk, is arranged on the valve body 5 in such a way that it extends over the throughflow opening 7 opposite the valve tip 9 or the valve seat 8, with the result that a flow chamber 15, in which the valve tip 9 is situated, is formed between the perforated injection plate 14 and the valve body 5. Here, in the closed state of the injection valve 2, the perforated injection plate 14 is arranged at a spacing from the valve tip 9, with the result that the valve piston 6 is axially displaceable in the direction of the perforated injection plate 14 and can thus be released from the valve seat 8 in order to open the throughflow opening 7.

An axial projection 17 is provided centrally on the underside 16 of the valve tip 9 that faces the perforated injection plate 14, which projection forms an axial stop 18 which interacts with the perforated injection plate 14 if the valve piston 6 is released by a corresponding distance from the valve seat 8. The maximum stroke of the valve piston 6 can thus be set in a simple manner through the design or axial height of the axial projection 7 and the position or design of the perforated injection plate 14. In particular, for this purpose, the perforated injection plate 14 is designed to be plastically deformable so that, by deforming the perforated injection plate 14, the piston stroke of the valve piston 6 can also still be set subsequently. Apart from the axial projection 17, the underside 16 of the valve tip 9 is preferably designed to be planar or flat, in particular with a surface extending parallel to the perforated injection plate 14, such that, with the valve piston 6 in the completely displaced or maximum displaced state, a narrow gap is formed between the valve tip 9 and the perforated injection plate 14. The contour of the throughflow opening 7 in the region of the flow chamber 15 is preferably formed in such a way that there is present, between the valve tip 9 and the valve body 5, with the valve piston 6 in the maximum displaced state, a substantially uniform and narrow gap between the valve tip 9 and valve body 5, which leads to high flow velocities.

The perforated injection plate 14 is itself provided with a plurality of injection openings 19 which are arranged with a particularly uniform distribution over the periphery of the perforated injection plate 14. The injection openings 14 are preferably produced by laser machining, in particular by ultra-short pulse (USP) laser, with the result that they can also have very small diameters. In particular, provision is preferably made here for at least some of the injection openings 19 to be oriented obliquely, in particular to generate collision beams.

During operation, the pressure generator 3 delivers hydraulic medium into a prechamber 20 of the injection valve 2, in which prechamber the spring element 11 and the supporting plate 10 are also arranged. From there, the medium flows into the throughflow opening 7 and builds up a pressure which counteracts the spring force. If the hydraulic pressure generated exceeds the force of the spring element 11, the hydraulic medium urges the valve piston 6 in the direction of the perforated injection plate 14 until the axial stop 18 strikes the perforated injection plate 14. Here, owing to the advantageous design of the throughflow opening 7, the hydraulic medium is accelerated in the direction of the narrowest point of the throughflow opening 7, with the result that a high-quality spray is already generated in the narrow gap between the valve seat 8 and valve tip 9. Here, the valve seat 8 is expediently situated on the smallest diameter of the throughflow opening 7, and therefore a drift of the opening pressure as a result of a seat adjustment is excluded.

According to the present exemplary embodiment, the valve piston 6 is provided with a helical or thread-like groove 21 which extends from the cylindrical lateral wall of the shaft of the valve piston 6 to the valve tip 9. Here, the groove 21 terminates at the valve tip 9, such that the valve tip 9 itself is formed in a groove-free manner, and ensures a continuous annular bearing contact in particular in the region of the valve seat 8. In conjunction with the gap between the valve body 5 and valve piston 6 that tapers toward the valve seat 8, the groove 21 causes the hydraulic medium also to experience a swirl, in addition to the velocity increase, which swirl improves the spray dispersal. The advantageously designed throughflow opening 7 in the region of the flow chamber 15 ensures that the hydraulic medium is optimally guided in the flow chamber 15 and fed to the injection openings 19. The valve tip 9 and the valve body 5 preferably have, in the region of the flow chamber 15, rounded-off portions or bevels 22, 23 which further optimize the flow behavior. If the valve piston 6 bears by the axial stop 18 on the perforated injection plate 14, the hydraulic medium is very greatly accelerated in accordance with the continuity equation and thus generates at the injection openings 19, on account of the very high velocity, a very fine spray with particularly small drops, which leads to good mixing of the exhaust-gas aftertreatment agent with exhaust gas of an internal combustion engine.

Moreover, the injection device 1 provides the advantage that the valve seat 8 is protected by the perforated injection plate 14 from soot particles in the exhaust gas of an internal combustion engine. The perforated injection plate 14 also has the effect that the valve seat 8 is not directly exposed to the high temperature of the exhaust gas. Moreover, the high pressures generated by the pressure generator 3 have the effect that the perforated injection plate 14 can be effectively cleaned by a correspondingly settable pump mode, for example a plurality of injections with a large amount and high pressure.

What is claimed is:

1. An injection device (1), comprising:
   a pressure-controlled and outward-opening injection valve (2) which includes an axially displaceable valve piston (6) which penetrates through a throughflow opening (7) in a valve body (5) and has a valve tip (9) at one end,
   a valve seat (8) assigned to the throughflow opening (7), and
   at least one spring element (11) which urges the valve piston (6) having the valve tip (9) against the valve seat (8) in order to close the throughflow opening (7),
   wherein the throughflow opening in the valve body continually tapers in a direction toward the valve seat,
   wherein the valve tip (9) is axially displaceable in a flow chamber (15) which is formed between the valve body (5) and a perforated injection plate (14) which has a plurality of injection openings (19), and
   wherein the valve tip (9) has, on a side opposed to the valve seat (8), an axial stop (18) interacting with the perforated injection plate (14), characterized in that the axial stop (18) is formed by an axial projection (17) on a flat underside (16) of the valve tip (9) that is assigned to the perforated injection plate (14).

2. The injection device as claimed in claim 1, characterized in that the flow chamber (15) has a longitudinal section which corresponds at least substantially to the longitudinal section of the valve tip (9).

3. The injection device as claimed in claim 2, characterized in that the perforated injection plate (14) is plastically deformable to set a maximum stroke of the valve piston (6).

4. The injection device as claimed in claim 3, characterized in that the valve piston (6) is provided with a narrow spiral groove (21).

5. The injection device as claimed in claim 4, characterized in that the throughflow opening (7) in the valve body (5) has a cross section which tapers, as viewed in a throughflow direction, in a direction of the valve seat (8).

6. The injection device as claimed in claim 5, further comprising a pressure generator (3) for forming a pump-nozzle unit.

7. The injection device as claimed in claim 1, characterized in that the perforated injection plate (14) is plastically deformable.

8. The injection device as claimed in claim 1, characterized in that the valve piston (6) is provided with a narrow spiral groove (21).

9. The injection device as claimed in claim 1, further comprising a pressure generator (3) for forming a pump-nozzle unit.

10. The injection device as claimed in claim 1, wherein the injection device (1) is configured for use in an exhaust-gas aftertreatment system of an internal combustion engine.

11. The injection device as claimed in claim 1, characterized in that the perforated injection plate (14) is plastically deformable to set a maximum stroke of the valve piston (6).

12. A method for producing an injection device (1) as claimed in claim 1, characterized in that the perforated injection plate (14) is plastically deformed in order to set a maximum stroke of the valve piston (6).

* * * * *